(12) United States Patent
Chen et al.

(10) Patent No.: US 10,083,544 B2
(45) Date of Patent: Sep. 25, 2018

(54) SYSTEM FOR TRACKING A HANDHELD DEVICE IN VIRTUAL REALITY

(71) Applicant: Google Inc., Mountain View, CA (US)

(72) Inventors: Shiqi Chen, Mountain View, CA (US); Zhaoyang Xu, Mountain View, CA (US); Alexander James Faaborg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 15/193,777

(22) Filed: Jun. 27, 2016

(65) Prior Publication Data

US 2017/0011553 A1 Jan. 12, 2017

Related U.S. Application Data

(60) Provisional application No. 62/189,292, filed on Jul. 7, 2015.

(51) Int. Cl.
*G06T 19/00* (2011.01)
*G06F 3/0346* (2013.01)
(Continued)

(52) U.S. Cl.
CPC ........ *G06T 19/003* (2013.01); *G02B 27/0172* (2013.01); *G06F 3/005* (2013.01); *G06F 3/011* (2013.01); *G06F 3/012* (2013.01); *G06F 3/0304* (2013.01); *G06F 3/0346* (2013.01); *G06T 7/74* (2017.01); *G06T 19/006* (2013.01); *G02B 2027/0178* (2013.01); *G06T 2200/04* (2013.01);
(Continued)

(58) Field of Classification Search
CPC ............ G09G 5/10; G09G 5/00; G09G 5/377; G06Q 30/04; G06F 3/01; G06F 3/012; G06T 19/006; A61B 5/11; A61B 5/6803; A61B 5/6814; A61B 2017/00216; A61B 2090/502
See application file for complete search history.

(56) References Cited

U.S. PATENT DOCUMENTS 5,574,479 A 11/1996 Odell
7,864,159 B2 * 1/2011 Sweetser ............... G06F 3/0325
345/158

(Continued)

OTHER PUBLICATIONS

International Search Report and Written Opinion for PCT Application No. PCT/US2016/39813, dated Oct. 10, 2016, 16 pages.

*Primary Examiner* — Diane Wills
(74) *Attorney, Agent, or Firm* — Brake Hughes Bellermann LLP

(57) ABSTRACT

A system for tracking a first electronic device, such as a handheld smartphone, in a virtual reality environment generated by a second electronic device, such as a head mounted display may include detection, by a camera included in one of the first electronic device or the second electronic device, of at least one visual marker included on the other of the first electronic device or the second electronic device. Features detected within the field of view corresponding to known features of the visual markers may be used to locate and track movement of the first electronic device relative to the second electronic device, so that movement of the second electronic device may be translated into an interaction in a virtual experience generated by the second electronic device.

19 Claims, 11 Drawing Sheets

(51) Int. Cl.
  *G06F 3/01*   (2006.01)
  *G06F 3/00*   (2006.01)
  *G06F 3/03*   (2006.01)
  *G06T 7/73*   (2017.01)
  *G02B 27/01*  (2006.01)

(52) U.S. Cl.
  CPC ............ *G06T 2207/10048* (2013.01); *G06T 2207/30204* (2013.01); *G06T 2207/30244* (2013.01)

(56) References Cited

U.S. PATENT DOCUMENTS

| | | |
|---|---|---|
| 2012/0109150 A1 | 5/2012 | Quaid et al. |
| 2013/0278635 A1* | 10/2013 | Maggiore ............ G06T 19/006 345/633 |
| 2014/0168261 A1* | 6/2014 | Margolis ................ G06F 3/011 345/633 |
| 2014/0361977 A1 | 12/2014 | Stafford et al. |
| 2014/0362110 A1 | 12/2014 | Stafford |
| 2015/0094142 A1* | 4/2015 | Stafford ................ A63F 13/212 463/31 |
| 2015/0235426 A1* | 8/2015 | Lyons ................ G02B 27/0172 345/8 |
| 2016/0292922 A1* | 10/2016 | Kasahara ............. G06F 3/1454 |

* cited by examiner

SYSTEM FOR TRACKING A HANDHELD DEVICE IN VIRTUAL REALITY

CROSS REFERENCE TO RELATED APPLICATIONS

This application claims priority to U.S. Application No. 62/189,292, filed on Jul. 7, 2015, the disclosure of which is incorporated in its entirety.

FIELD

This document relates, generally, to detection and tracking of an electronic device in an augmented reality and/or virtual reality environment.

BACKGROUND

An augmented reality (AR) and/or a virtual reality (VR) system may generate a three-dimensional (3D) immersive virtual environment. A user may experience this virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual environment, user interaction with the virtual environment may take various forms, such as, for example, physical movement and/or manipulation of an electronic device to interact with, personalize and control the virtual environment.

SUMMARY

In one aspect, a method may include operably coupling a first electronic device with a second electronic device so that the first electronic device and the second electronic device are in communication with each other while operating in an ambient environment, the second device being configured to generate and display a virtual environment while operating in the ambient environment, detecting at least one visual marker on one of the first electronic device or the second electronic device by a sensor of the other of the first electronic device or the second electronic device, detecting and tracking movement of the first electronic device in the ambient environment based on features detected in the at least one visual marker, and translating the detected and tracked movement of the first electronic device in the ambient environment into a corresponding action in the virtual environment In another aspect, a system may include a handheld electronic device including an optical sensor and a processor, the handheld electronic device being configured to be operably coupled with a head mounted electronic device having a plurality of visual markers on an exterior surface of a housing, wherein the handheld electronic device is configured to determine a location and movement of the handheld electronic device relative to the head mounted electronic device based on images captured by the optical sensor of the handheld electronic device and identification of predetermined features in the captured images, the predetermined features corresponding to the plurality of visual markers.

The details of one or more implementations are set forth in the accompanying drawings and the description below.

Other features will be apparent from the description and drawings, and from the claims.

DETAILED DESCRIPTION

A user immersed in a 3D virtual environment wearing, for example, a head mounted display (HMD) device may explore the virtual environment and interact with virtual objects, features and the like in the virtual environment through, for example, physical interaction (such as, for example, hand/arm gestures, head movement, walking and the like) and/or manipulation of the HMD and/or a separate electronic device to experience the virtual environment. For example, in some implementations, the HMD may be paired with a handheld electronic device, such as, for example, a controller, a gyromouse, a smartphone or other such handheld electronic device. User manipulation of the handheld electronic device paired with the HMD may allow the user to interact with the virtual environment generated by the HMD.

Figure 1:
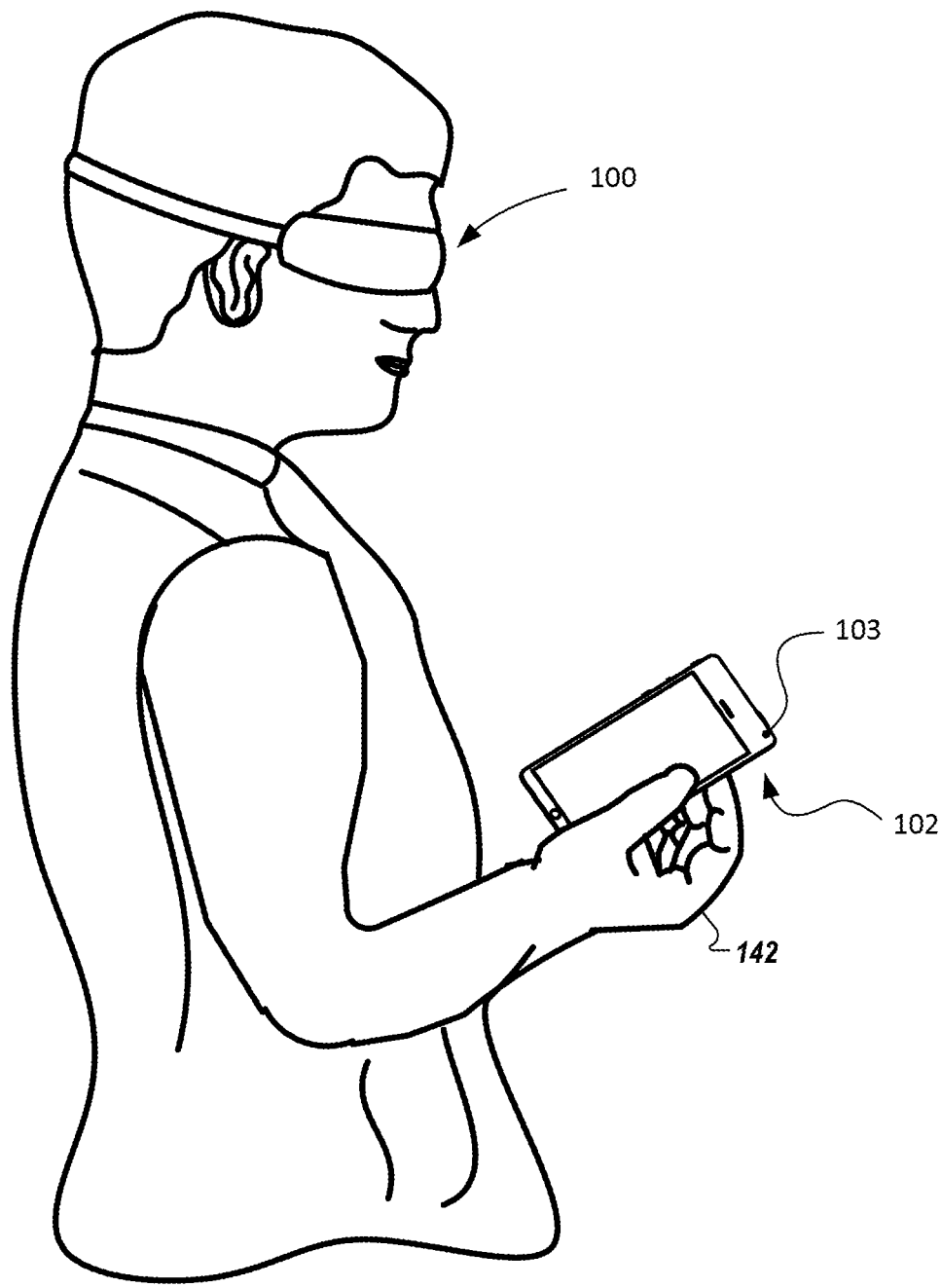
FIG. 1 is an example of a virtual reality system including a head mounted display and a handheld electronic device, in accordance with implementations as described herein.

In the example implementation shown in FIG. 1, a user wearing an HMD 100 is holding a portable handheld electronic device 102, such as, for example, a controller, a gyromouse, a smartphone and the like, in his hand 142. In the example shown in FIG. 1, the user is holding the smartphone 102 with his right hand. However, the user may also hold the device 102 with his left hand, or with both his left hand and his right hand, and still interact with the immersive virtual experience generated by the HMD 100.

Figure 2A:
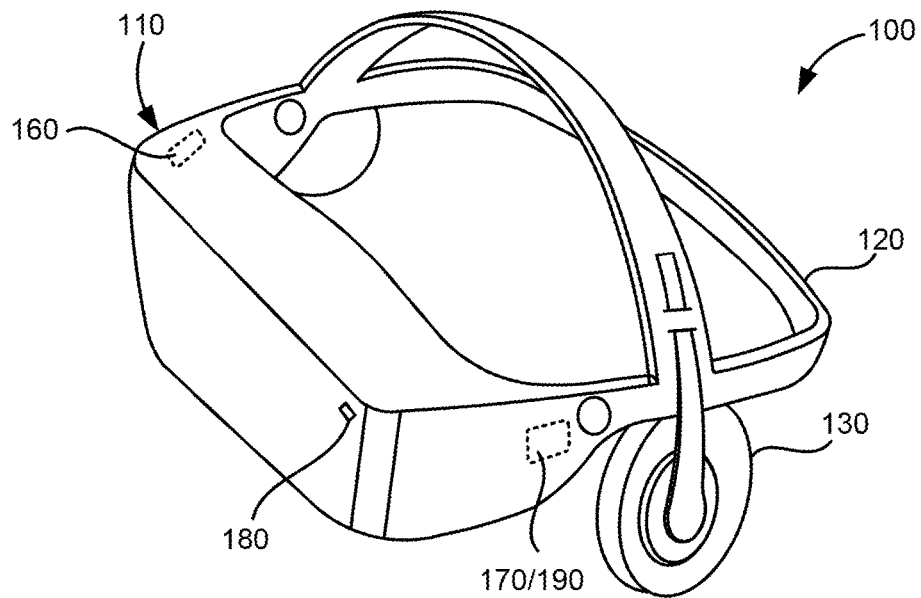
FIGS. 2A and 2B are perspective views of an example head mounted display, in accordance with implementations as described herein.
Figure 2B:
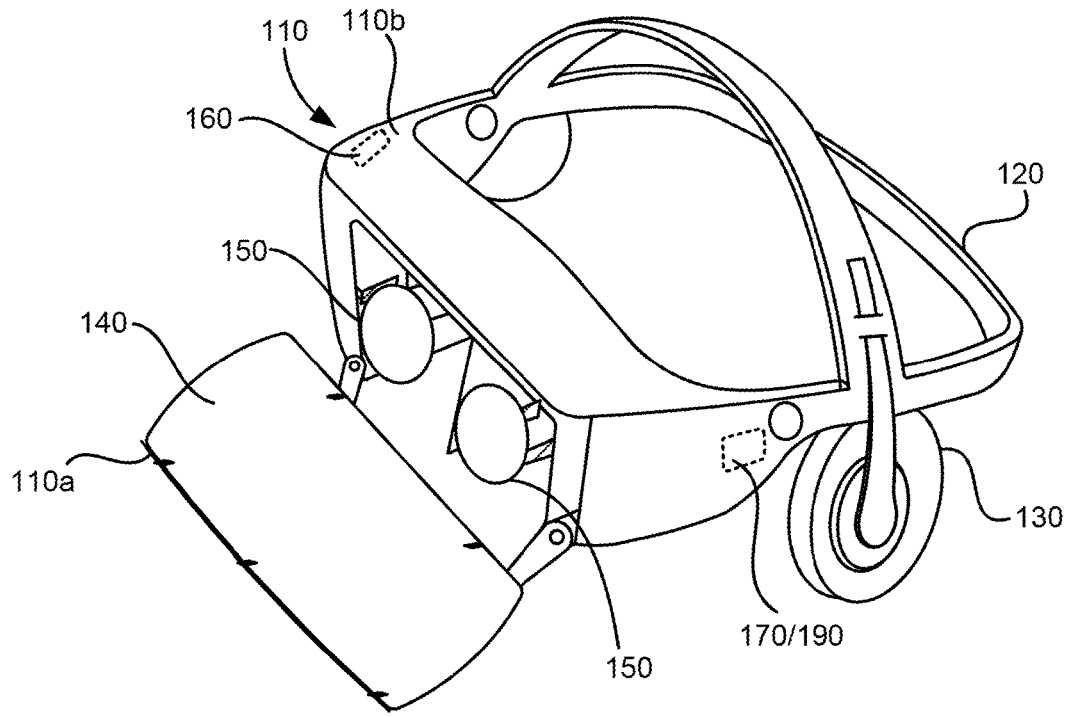

FIGS. 2A and 2B are perspective views of an example HMD, such as, for example, the HMD 100 worn by the user in FIG. 1, to generate an augmented and/or virtual environment to be experienced by the user. The HMD 100 may include a housing 110 in which optical components may be received. The housing 110 may be coupled, for example, rotatably coupled and/or removably attachable, to a frame 120 which allows the housing 110 to be mounted or worn on the head of the user. An audio output device 130 may also coupled to the frame 120, and may include, for example, speakers mounted in headphones and coupled on the frame 120.

In FIG. 2B, a front face 110a of the housing 110 is rotated away from a base portion 110b of the housing 110 so that some of the components received in the housing 110 are visible. A display 140 may be mounted on the front face 110a of the housing 110. Lenses 150 may be mounted in the housing 110, between the user's eyes and the display 140 when the front face 110a is in the closed position against the base portion 110b of the housing 110. A position of the lenses 150 may be may be aligned with respective optical axes of the user's eyes to provide a relatively wide field of view and relatively short focal length.

The HMD 100 may also include a sensing system 160 including various sensing system devices and a control system 170 including various control system devices to facilitate operation of the HMD 100. The control system 170 may also include a processor 190 operably coupled to the components of the control system 170.

In some implementations, the HMD 100 may also include a camera 180 which may capture still and moving images of the environment outside of the HMD 100. For example, in some implementations, the camera 180 may capture images of tracking markers on, for example, the handheld electronic device 102, or other location. Images of tracking markers captured by the camera 180 may be recognized and processed by the HMD 100 to determine a position and movement of the handheld electronic device 102, and/or a position and/or movement of the HMD 100 in the space. In some implementations, the camera 180 may include, for example, an infrared (IR) illuminator and an infrared sensor to capture images of indicators illuminated by the IR illuminator. In some implementations, the camera 180 may include, for example, a depth sensor that can determine a distance from the camera 180 on the HMD 100 to, for example, the user's hand(s) 142 holding the electronic device 102. In some implementations, the camera 180 may capture still and moving images of the real world, or ambient, environment. The images captured by the camera 180 may be displayed to the user on the display 140 in a pass through mode, allowing the user to temporarily leave the virtual world and return to the real world without removing the HMD 100 or otherwise changing the configuration of the HMD 100 to move the housing 110 out of the line of sight of the user.

In some implementations, the HMD 100 may also include one or more identification markers 115, for example, on an outer surface of the HMD 100. The one or more markers 115 may be included, for example, on one or more outer surfaces of the housing 110 of the HMD 100, so that the markers 115 may be detectable by the handheld electronic device 102. For example, in some implementations, the markers 115 on the HMD 100 may be captured within a field of view of an image sensor and/or an optical sensor and/or a light sensor of the handheld electronic device 102, such as, for example, a front facing camera 103 of the handheld electronic device 102 held by the user. The markers 115 may include features that are quickly and/or accurately machine readable. For example, in some implementations, an initial pattern and/or feature of a pattern, may be detected in one frame, depending on a capture rate, or frame rate, of the camera 103. Subsequent feature detection and tracking, in which the pattern moves with respect to the initial detection, may be accomplished in a relatively short period of time, for example, less than 3 ms. In some implementations, subsequent feature detection may take greater than 3 ms, depending on, for example, the pattern, the capabilities of the detection system, and other such factors. Features included in the markers 115 may include, for example, a non-repeating pattern, a plurality of distinct corners, and other such features. For example, the marker may include a matrix barcode, or two-dimensional barcode, or a quick response (QR) code, that defines a machine readable optical marker. Other quickly and/or accurately captured, identified and processed optical markers including, for example, non-repeating patterns and/or a plurality of distinctive corners, may also be included.

In some implementations, the markers 115 on the HMD 100 may be visible on the outer surface of the HMD 100 as described above. In some implementations, the markers 115 on the HMD 100 may be detectable by, for example, an IR illuminator and IR sensor/camera included in the handheld electronic device 102, so that the markers 115 are not visible to the human eye.

Figure 3A:
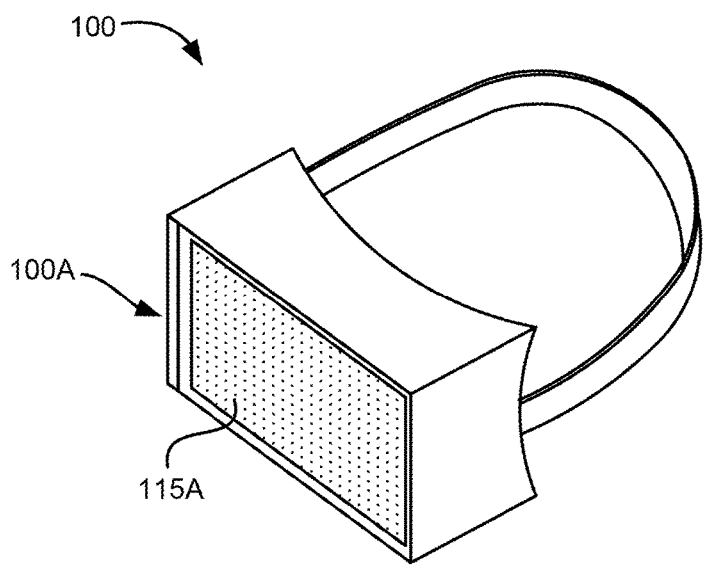
FIG. 3A is a front perspective view and FIG. 3B is a bottom perspective view of an example head mounted display including a visual marker.
Figure 3B:
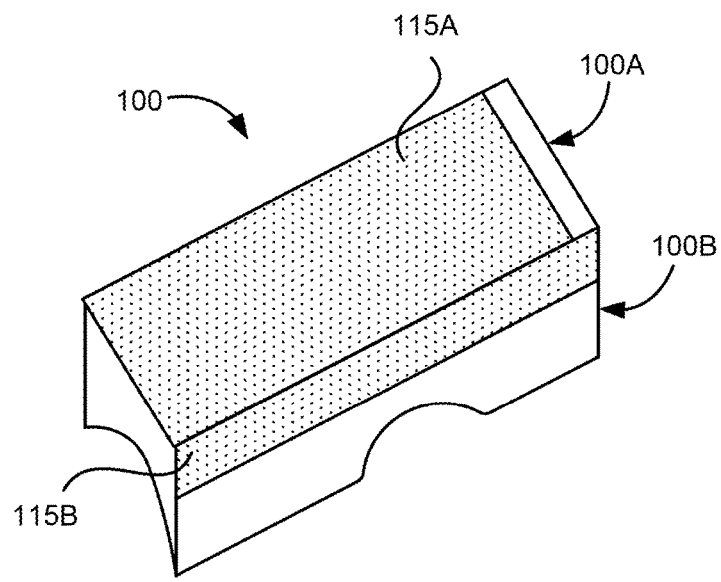

One example of an HMD 100 including markers to be captured within the field of view of the image sensor and/or optical sensor and/or light sensor, or front facing camera 103, of the handheld electronic device 102 held by the user is shown in FIGS. 3A and 3B. One or more markers 115 (represented by the shaded areas 115A and 115B shown in FIGS. 3A and 3B) can be included on one or more surfaces of the HMD 100. In this example, a first marker 115A is positioned across a front facing surface 100A of the housing 110 of the HMD 100, and a second marker 115B is positioned across a bottom facing surface 100B of the housing 110 of the HMD 100. The first marker 115A and the second marker 115B are shown on the front facing surface 100A and the bottom facing surface 100B of the housing 110 of the HMD 100, simply for ease of discussion and illustration. For example, markers may be positioned along a left lateral side and/or a right lateral side of the housing 110 of the HMD 100, in addition to, or instead of, the first and second markers 115A and 115B shown in FIGS. 3A and 3B, as long as the markers may be detected by the handheld electronic device 103, for example, captured with in the field of view of the front facing camera 103 of the handheld electronic device 102 held by the user. Hereinafter, simply for ease of discussion and illustration, the image sensor and/or optical sensor and/or light sensor on the handheld electronic device 102 that detects the one or more markers 115 on the HMD 100 will be referred to as a front facing camera 103.

Figure 3C:
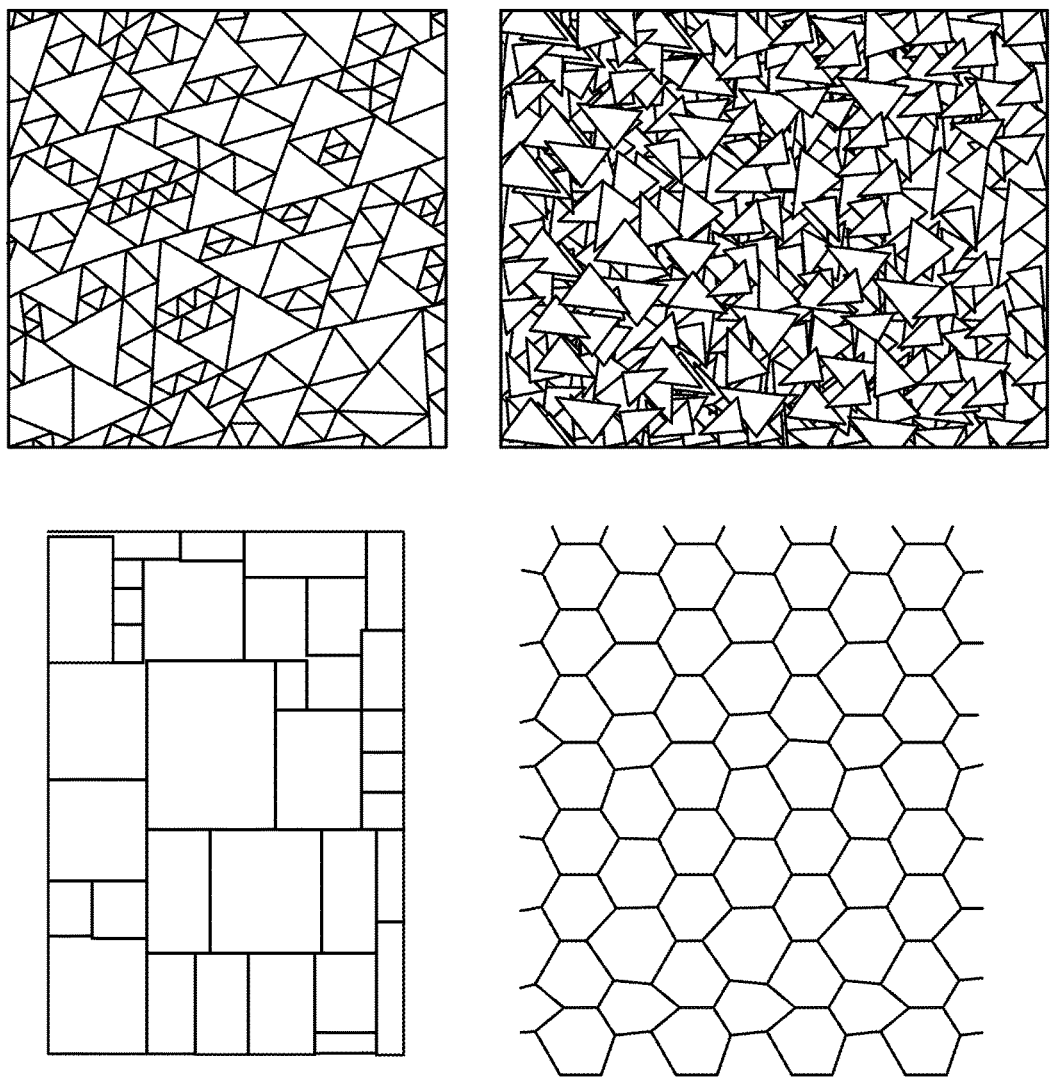
FIG. 3C illustrates examples of patterns which may be included in the visual marker, in accordance with implementations as described herein.

The first marker 115A shown in FIGS. 3A and 3B covers essentially the entire front facing surface 100A of the HMD 100. However, in some implementations, the first marker 115 may partially cover the front facing surface 100A of the HMD 100, or other surface of the HMD 100. As noted above, the first and second markers 115A and 115B shown in FIGS. 3A and 3B include a non-repeating pattern including a plurality of distinct, non-repeating edges and/or corners. For example, the markers 115 may include a non-repeating pattern as one of the examples shown in FIG. 3C, or other pattern that may be detected and recognized as described herein, in the shaded areas shown in FIGS. 3A and 3B.

In some implementations, a matching of as few as four corners between the detected pattern in the marker 115 and the image captured by the front facing camera 103 may be used to identify the pattern. A greater of number of corners, and/or a greater number of corners matched between the detected pattern and the captured image, may yield a more reliable result. Reliability in detection, matching and tracking may depend on, for example, a size, or and area, of the visual marker 115, a level of print quality of the visual marker 115, a resolution capability of the front facing camera 103, a distance between the image sensor 103 and the visual marker 115, and other such factors. In some implementations, a size of the visual marker 115 may be greater than or equal to 5 cm×5 cm. In some implementations, a size of the visual marker 115 may be less than 5 cm×5 cm.

Figure 3D:
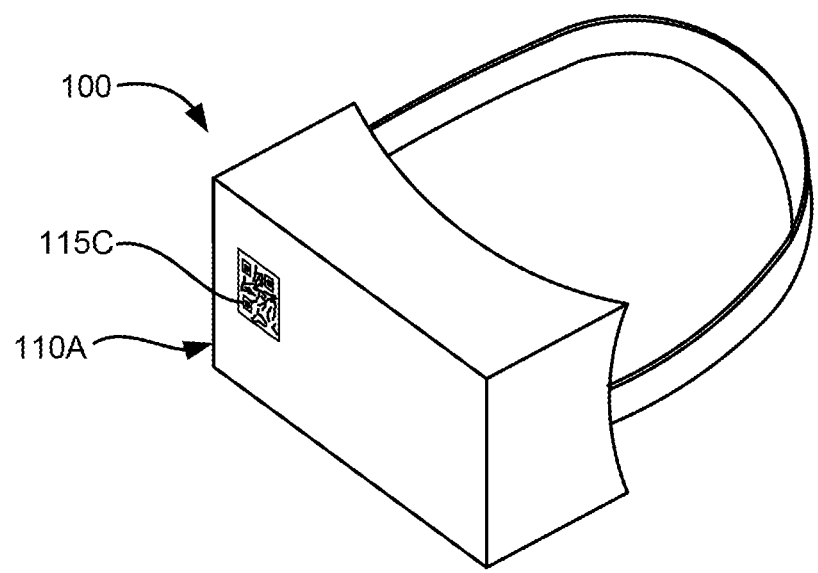
FIG. 3D is a front perspective view and FIG. 3E is a bottom perspective view of an example head mounted display including a visual marker, in accordance with implementations as described herein.
Figure 3E:
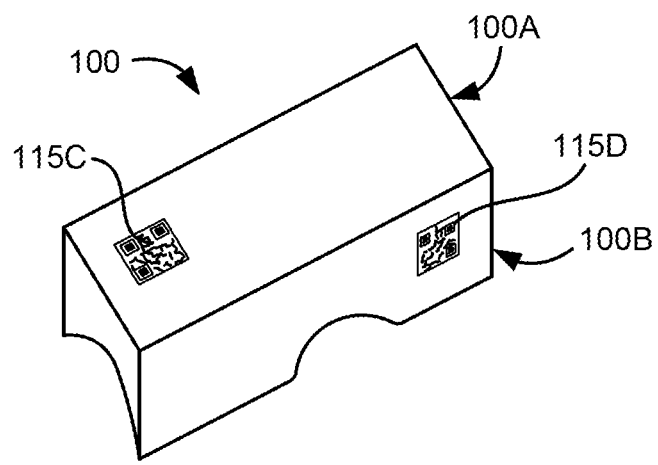

Another example of an HMD 100 including markers to be captured within the field of view of the front facing camera 103 of the handheld electronic device 102 held by the user is shown in FIGS. 3D and 3E. In this example, a first marker 115C is positioned on the front facing surface 100A of the housing 110 of the HMD 100, and a second marker 115D is positioned on the bottom facing surface 100B of the housing 110 of the HMD 100. The first marker 115C and the second marker 115D are shown on the front facing surface 100A and the bottom facing surface 100B of the housing 110 of the HMD 100, simply for ease of discussion and illustration. For example, markers may be positioned along the left lateral side and/or the right lateral side of the housing 110 of the HMD 100, in addition to, or instead of, the first and second markers 115C and 115D shown in FIGS. 3D and 3E, as long as the markers may be captured with in the field of view of the front facing camera 103, of the handheld electronic device 102 held by the user. Similarly, in the example shown in FIGS. 3D and 3E, the first marker 115C is positioned at an upper right corner of the front face 100A of the HMD 100, and the second marker 115D is positioned at a lower left side of the bottom surface 100B of the HMD 100. However, the markers may be located at other positions on the HMD 100, as long as they may be captured within the field of view of the camera 103 of the handheld electronic device 102 held by the user. As noted above, the first and second markers 115C and 115D shown in FIGS. 3D and 3E include a matrix/two-dimensional bar code, or QR code, including a non-repeating pattern including distinct corners and/or edges that are quickly and easily captured, identified and processed.

In some implementations, more, or fewer, markers 115 may be included on the HMD 100 than the first markers 115A/115C and second markers 115B/115D shown in FIGS. 3A-3E, as long as the markers 115 may be captured with in the field of view of the front facing camera 103, of the handheld electronic device 102 held by the user. In some implementations, the markers 115 included on the HMD 100 may be arranged at different locations than the markers 115A-115D shown in FIGS. 3A-3E, as long as the markers 115 are positioned so that they may be captured within the field of view of the front facing camera 103, of the handheld electronic device 102 held by the user. Positioning of the visual markers 115 on the front facing side 100A and the bottom facing side 100B of the HMD 100 may allow for a relatively consistent and accurate capture of the markers 115 within the field of view of the front facing camera 103 of the handheld electronic device 102 held by the user, as, when the handheld electronic device 102 is held in the hand of the user, the front facing camera 103 can typically see at least one of the front facing surface 100A and/or the bottom facing surface 100B of the HMD 100, even as the user moves his hand/arm within the range of motion of the user's arm. In some implementations, the markers 115 may be included on the HMD 100 during fabrication. In some implementations, the markers 115 may be affixed to the HMD 100 by the user, and/or re-arranged by the user, at locations selected based on, for example, a particular HMD and handheld electronic device, use environment, and other such factors.

As noted above, in some implementations, the front facing camera 103 of the handheld electronic device 102 may include an IR illuminator and an IR sensor, so that the markers 115 on the HMD 100 (for example, the markers 115A and 115B on the HMD 100 shown in FIGS. 3A-3B, and/or the markers 115C and 115D on the HMD 100 shown in FIGS. 3D-3E) may be detected by the front facing camera 103 of the handheld electronic device 102, but the markers 115 are not visible to the human eye.

The handheld electronic device 102 including the front facing camera 103 as described above may be operably coupled with, or paired with the HMD 100 including markers 115 as described above. This pairing of the handheld electronic device 102 and the HMD 100 may provide for communication between the handheld electronic device 102 and the HMD 100 and the exchange of data between the handheld electronic device 102 and the HMD 100, so that a manipulation, or movement of the handheld electronic device 102 may be translated into a corresponding interaction, or movement, in the virtual environment generated by the HMD 100 and displayed to the user, for example, on the display 140 of the HMD 100.

After pairing, images captured by the front facing camera 103, of the handheld electronic device 102 held by the user may be used to detect a relative 6 degree-of-freedom (6DOF) location, movement and tracking of the HMD 100, using, for example, the images of the markers 115 on the HMD 100 captured within the field of view of the image sensor 103 of the handheld electronic device 102 held by the user. The 6 DOF position of the handheld electronic device 102 may include the X, Y and Z coordinates of the position of the handheld electronic device 102 in the three dimensional, physical, real world space in which the system is implemented, in coordination with movement of the handheld electronic device 102 about each of the X, Y and Z axes (for example, roll, pitch and yaw movement about the X, Y and Z axes) in the three dimensional space. Once the handheld electronic device 102 detects the relative 6DOF location of the HMD 100, the inverse transform of this relative location may yield the location of the handheld electronic device 102 relative to the HMD 100.

In some implementations, the movement of the handheld electronic device 102 about each of the X, Y and Z axes in the three dimensional space may be captured by, for example, sensors (for example, an inertial measurement unit including, for example, an accelerometer, a gyroscope and the like) included in the handheld electronic device 102. The combination of the three dimensional position of the handheld electronic device 102 in the physical, real world space detected based on detection of the markers, together with the movement of the handheld electronic device 102 about the X, Y and Z axes detected by the sensors of the handheld electronic device 102, may provide for 6DOF tracking of the handheld electronic device 102. This may allow various different types of inputs, manipulations and the like of the handheld electronic device 102 to be translated into corresponding interactions with virtual features, objects and the like in the virtual environment generated by the HMD 100 and displayed to the user, for example, on the display 140 of the HMD 100.

As the location of the handheld electronic device 102 relative to the HMD 100 is repeatedly/continuously determined, movement of the handheld electronic device 102 may be tracked, so that the movement of the handheld electronic device 102 may be translated into a corresponding interaction in the virtual environment generated by the HMD 100 and displayed to the user, for example, on the display 140 of the HMD 100. In some implementations, this inverse transform may involve the inversion of a matrix. For example, a matrix from the handheld electronic device 102 may be used to translate a point in the coordinate space of the HMD 100 to a coordinate space of the handheld electronic device 102. The inversion of this matrix may be computed to translate a point in the coordinate space of the handheld electronic device 102 to the coordinate space of the HMD 100. In this example, the coordinate space of the handheld electronic device 102 may be defined by a right-handed coordinate system anchored to the handheld electronic device 102, and the coordinate space of the HMD 100 may be defined by a right-handed coordinate system anchored to the HMS 100. The handheld electronic device 102 may transmit the inverted matrix to the HMD 100 for each frame captured. The HMD 100 may then use this matrix of numbers, for example, 16 numbers, to render the handheld electronic device 102 so that it appears to be at the same location as in the real world, and render movement of the handheld electronic device based on actual movement.

Figure 4:
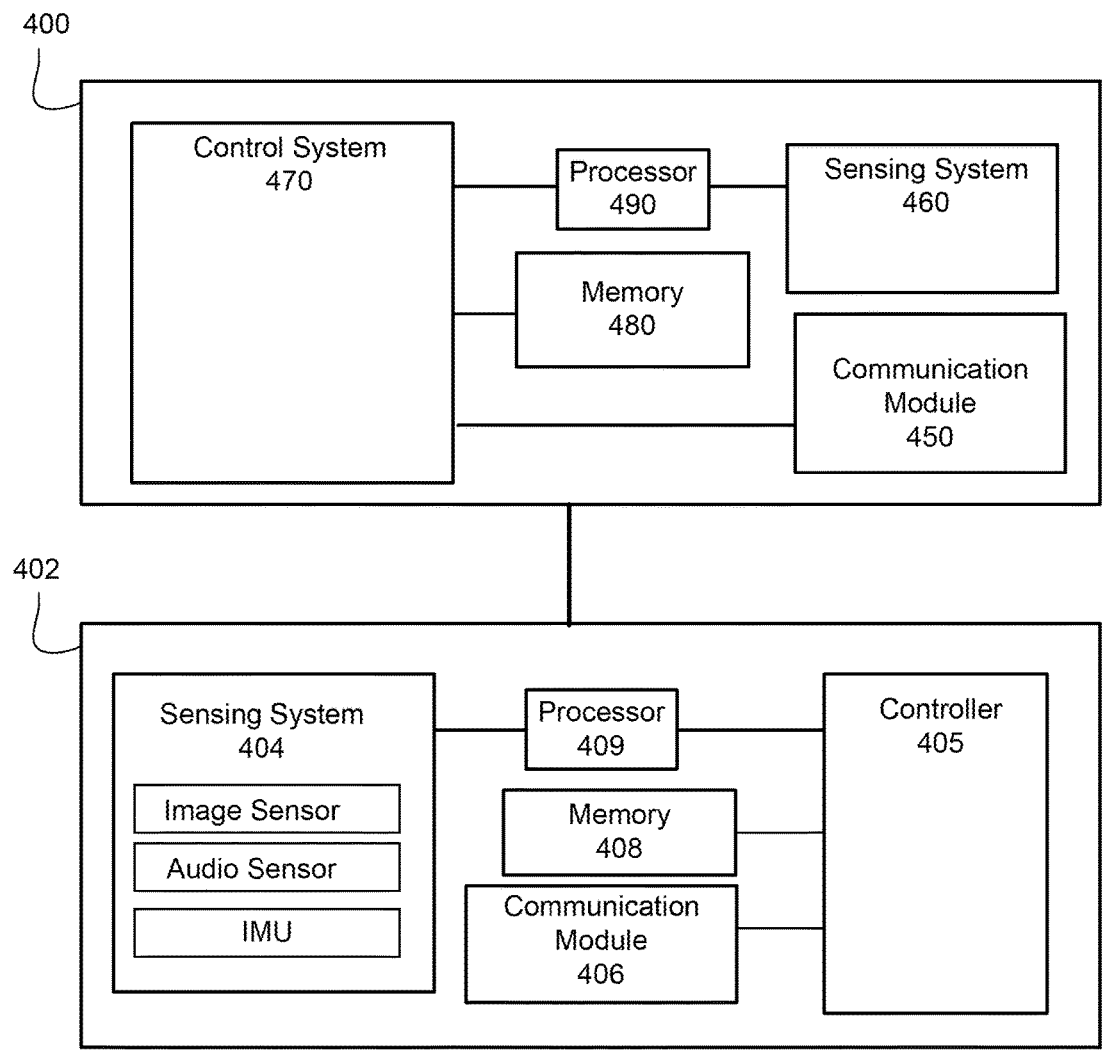
FIG. 4 is a block diagram of a head mounted display and a handheld electronic device, in accordance with implementations as described herein.

A block diagram of a system for tracking a handheld device in an augmented and/or virtual reality environment is shown in FIG. 4. The system may include a first user electronic device 400 in communication with a second user electronic device 404. The first user electronic device 400 may be, for example an HMD as described above with respect to FIGS. 2A-2B and 3A-3E, generating an augmented and/or virtual reality environment to be experienced by the user, and the second user electronic device 402 may be, for example, a handheld electronic device as described above with respect to FIG. 1, that facilitates user interaction with the augmented and/or virtual reality environment generated by the HMD. For example, as described above, physical movement of the second (handheld) electronic device 402 in may be translated into a desired interaction in the virtual environment generated by the first (head mounted) electronic device 400.

The first electronic device 400 may include a sensing system 460 and a control system 470, which may be similar to the sensing system 160 and the control system 170, respectively, shown in FIGS. 2A and 2B. In the example implementation shown in FIG. 4, the sensing system 460 may include numerous different types of sensors, including, for example, a light sensor, an audio sensor, a distance/proximity sensor, an infrared sensor and/or illuminator, a gyroscope, an accelerometer, and/or other sensors and/or different combination(s) of sensors. In some implementations, the light sensor, image sensor and audio sensor may be included in one component, such as, for example, a camera, such as the camera 180 of the HMD 100 shown in FIGS. 2A and 2B. The control system 470 may include numerous different types of devices, including, for example, a power/pause control device, audio and video control devices, an optical control device, a transition control device, and/or other such devices and/or different combination(s) of devices. In some implementations, the sensing system 460 and/or the control system 470 may include more, or fewer, devices, depending on a particular implementation. The elements included in the sensing system 460 and/or the control system 470 can have a different physical arrangement (e.g., different physical location) within, for example, an HMD other than the HMD 100 shown in FIGS. 2A and 2B.

The first electronic device 400 may also include a processor 490 in communication with the sensing system 460 and the control system 470, a memory 480 accessible by, for example, a module of the control system 470, and a communication module 450 providing for communication between the first electronic device 400 and another, external device, such as, for example, the second electronic device 402 paired to the first electronic device 400.

The second electronic device 402 may include a communication module 406 providing for communication between the second electronic device 402 and another, external device, such as, for example, the first electronic device 400 paired to the second electronic device 402. The second electronic device 402 may include a sensing system 404 including an image sensor including for example an IR illuminator and IR sensor or other type of image capturing sensor, an audio sensor, such as is included in, for example, a camera and microphone, an inertial measurement unit including, for example, an accelerometer and/or a gyroscope and/or a magnetometer, and other such sensors and/or different combination(s) of sensors. A processor 409 may be in communication with the sensing system 404 and a controller 405 of the second electronic device 402, the controller 405 having access to a memory 408 and controlling overall operation of the second electronic device 402.

As noted above, the user may manipulate the handheld electronic device 102 through, for example, inputs applied to touch surfaces, buttons, knobs and other manipulation devices of the handheld electronic device 102, physical movement of the handheld electronic device 102, and other manipulations of the handheld electronic device 102 to interact with virtual features, objects and the like in the virtual environment, such as, for example, to cause movement of a virtual feature or element in the virtual environment generated by the HMD 100. For example, the user may be virtually holding a virtual item in the virtual environment. With the handheld electronic device 102 paired with the HMD 100, and the handheld electronic device 102 held in one or both hands of the user, the front facing camera 103, of the handheld electronic device 102 may view and track the visual markers 115 on the HMD 100 to establish a location of the HMD 100 relative to the handheld electronic device 102. The inverse transform of this relative location may be used to locate and track the 6DOF movement of the handheld electronic device 102 relative to the HMD 100. The system may translate the determined location/position/orientation/movement of the handheld electronic device 102 in the real world environment into corresponding movement of the virtual item held in the virtual environment, or other action corresponding to the type of movement detected.

In this arrangement, the visual markers 115 included on the HMD 100 are passive markers. That is, in this example implementation, the markers 115 are simply patterns that may be detected by the handheld electronic device 102, and do not emit any type of signal that is detected by the handheld electronic device 102 for detection. In this implementation, the detection, identification, and processing is all done by the handheld electronic device 102. This may alleviate processing workload on the HMD 100, allowing the HMD 100 to apply the available processing resources and battery power to generating the virtual environment.

Figure 5:
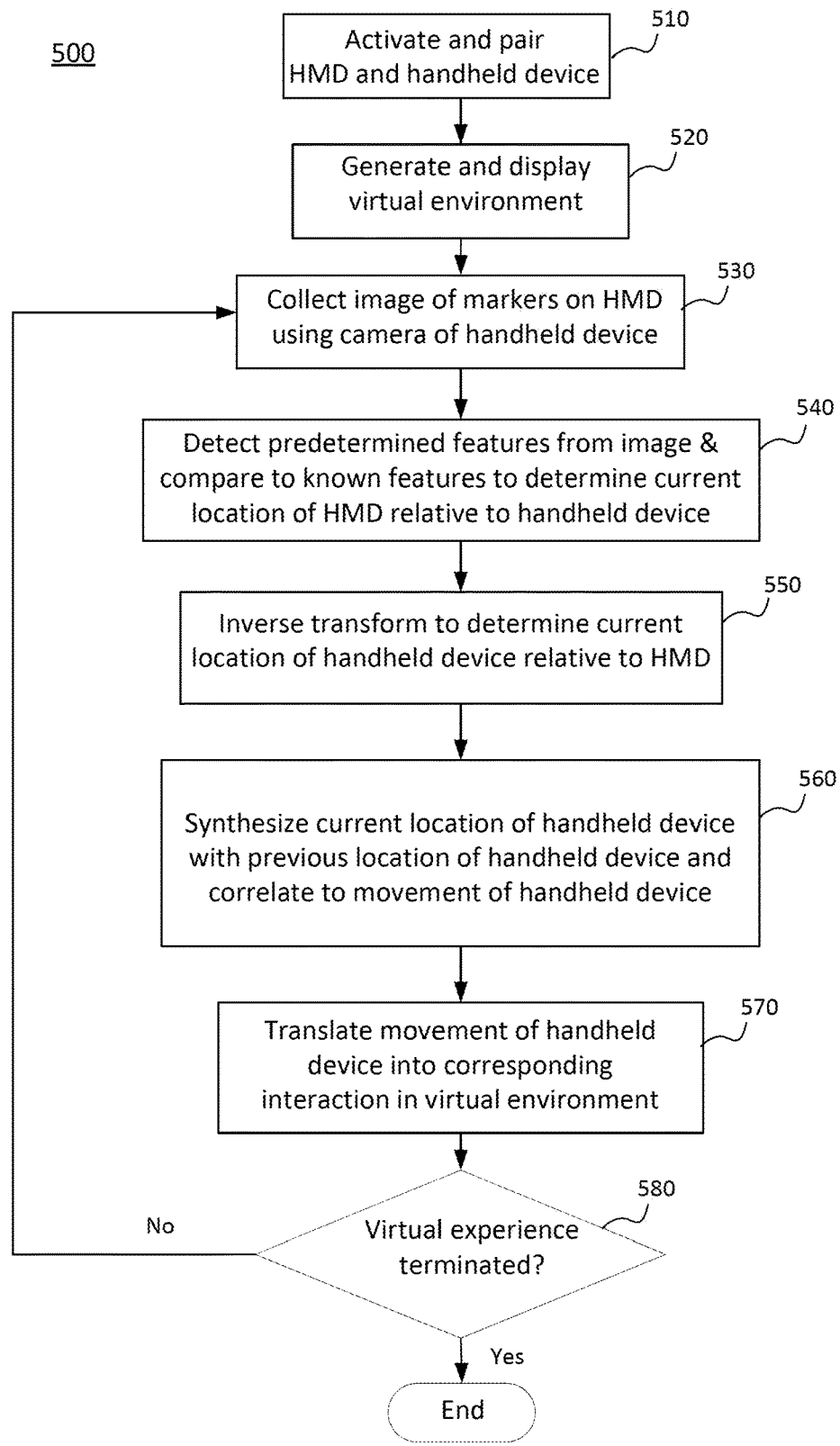
FIG. 5 is a flowchart of a method of tracking a handheld electronic device in an augmented and/or virtual reality environment, in accordance with implementations as described herein.

A method 500 of tracking a handheld electronic device in an augmented and/or virtual reality environment, in accordance with implementations as broadly described herein, is shown in FIG. 5. As noted above, the handheld electronic device may be, for example, the handheld electronic device 102 shown in FIG. 1. The handheld electronic device 102 may be operably coupled to, or paired with, for example, an HMD 100 as shown in FIGS. 1, 2A-2B, 3A-3E, configured to generate an immersive augmented and/or virtual reality environment. The handheld electronic device 102 may be paired with, and/or communicate with, the HMD 100 via, for example, a wired connection, a wireless connection via for example wifi or Bluetooth, or other type of connection. After the HMD 100 and the handheld electronic device 102 have been activated and paired, at block 510, and the virtual experience has been initiated, at block 520, data collection and data synthesis may be carried out by the HMD 100 and the handheld electronic device 102 to locate and track the position and movement of the handheld electronic device 102 and translate movement of the handheld electronic device 102 into a corresponding interaction in the virtual environment.

A sensor of the handheld electronic device 102, for example, the front facing camera 103 of the handheld electronic device 102, may scan a field of view and collect images within the field of view, at block 530. The system may then scan the images for predetermined features known to be included in the visual markers 115 on the HMD 100, at block 540. This may include, for example, a specific, non-repeating pattern, a plurality of distinct corners and/or edges, and the like, as discussed above. The images, and in particular, the detected features, may be compared to known images of the visual markers 115, including the predetermined features. The captured images may be compared to the known images, and a location and/or orientation of the HMD 100 relative to the handheld electronic device 102 may be determined based on how the predetermined features appear in the captured image compares to how the features are known to appear, for example, in an orthogonally aligned orientation of the handheld electronic device 102 and HMD 100. Once the location of the HMD 100 relative to the handheld electronic device 102 is determined, at block 540, the inverse transform may be calculated, at block 550, to determine the location of the handheld electronic device 102 relative to the HMD 100. In some implementations, the handheld electronic device 102 may collect and/or process this image data substantially continuously, or at a rate at which the markers 115 may be detected and movement of the handheld electronic device 102 may be tracked without any noticeable interruption.

The location data may be processed by the handheld electronic device 102, at block 560, to determine movement of the handheld electronic device 102, and the determined movement of the handheld electronic device 102 may be translated into a corresponding interaction and/or movement in the virtual environment generated by the HMD, at block 570. For example, location and movement and/or orientation data taken at a current point in time may be compared to location and movement and/or orientation data at the previous point in time, to determine a movement trajectory. The movement trajectory maybe substantially continuously updated as data is continuously collected, processed and synthesized.

This process may be repeatedly performed until it is determined, at block 580, that the virtual experience has been terminated.

In some implementations, a visual marker may be included on the handheld electronic device 102, so that the HMD 100, for example, the camera 180 of the HMD 100, may locate and track movement of the handheld electronic device 102 using the visual marker. An example of a visual marker rendered on a display of a handheld device such as a handheld electronic device is shown in FIG. 6A.

Figure 6B:
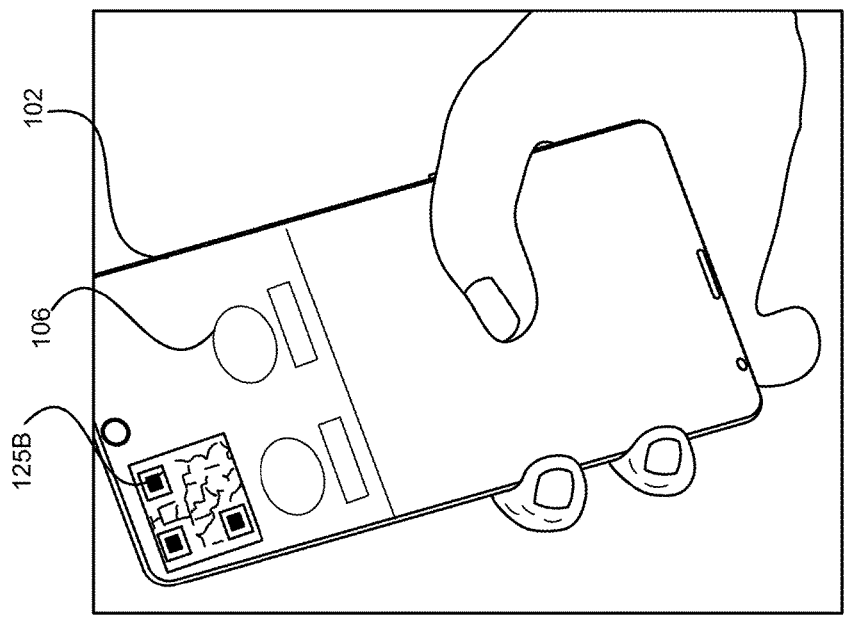
FIGS. 6A and 6B are front views of handheld electronic devices including visual markers.
Figure 6A:
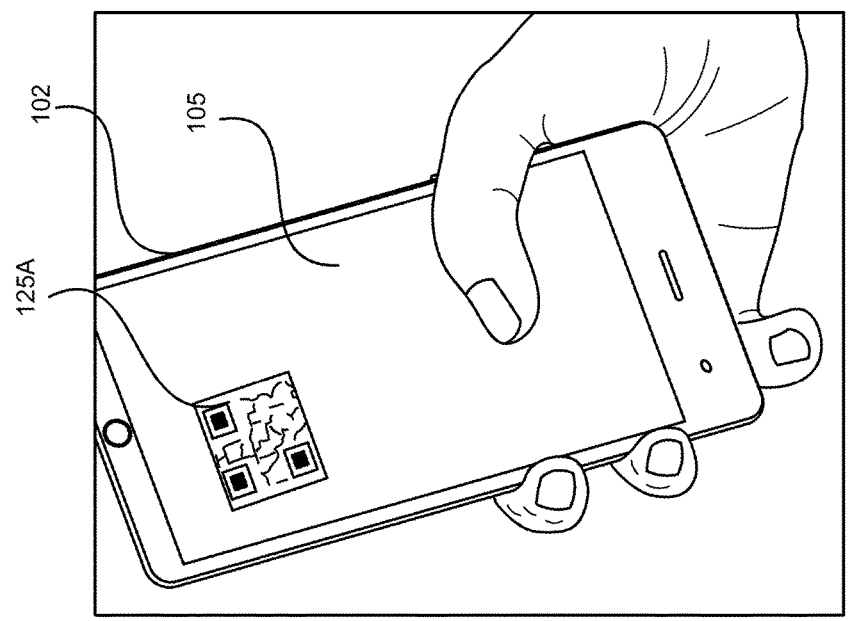

As shown in FIG. 6A, a visual marker 125A, such as, for example, a matrix barcode, or two-dimensional barcode, or QR code, may be displayed on or rendered on a display 105 of the handheld electronic device 102. In this example implementation, the visual marker 125A is rendered at the upper left corner of the display 105 of the handheld electronic device 102, with the user holding the handheld electronic device 102 in his right hand, so that the user's hand does not obstruct or impede a view of the visual marker 125A. The marker 125A rendered on the display 105 of the handheld electronic device 102 in this manner may be moved to a different location on the display screen to accommodate, for example, grasping of the handheld electronic device 102 with a different hand, or in a different orientation, or other such user preferences. This arrangement may allow for visual tracking of the handheld electronic device 102 by the camera 180 of the HMD 100, while not relying on space in a case or bezel of the handheld electronic device 102 to accommodate components for generating, affixing, or otherwise displaying the visual markers. This arrangement may also allow the display 105 and/or other manipulation surfaces of the handheld electronic device 102 to extend essentially to the outer edges of the front face of the handheld electronic device 102, essentially eliminating the need for a bezel, expanding the usable surface area of the device 102 and improving the utility of the device 102.

As shown in FIG. 6B, in some implementations, a visual marker 125B may be otherwise located on an outer surface 106 of the handheld electronic device 102, so that the visual marker 125B may be detected by, for example, the camera 180 of the HMD 100. The visual marker 125B may be, for example, integrated into an outer surface of the handheld electronic device 102, a sticker applied to or otherwise attached to an outer surface of the handheld electronic device 102, a case extension of the handheld electronic device 102, and the like. In some implementations, the visual marker 125B may be detectable by, for example, an IR illuminator and IR sensor/camera included in the HMD 100, so that the marker 125B is not visible to the human eye.

In some implementations, an infrared marker may be generated by the handheld electronic device 102, so that the HMD 100, for example, an infrared sensor, or camera, of the HMD 100, may locate and track movement of the handheld electronic device 102 using the infrared marker. An example of an infrared marker generated by, for example, a display of a handheld electronic device, is shown in FIG. 6C.

Figure 6C:
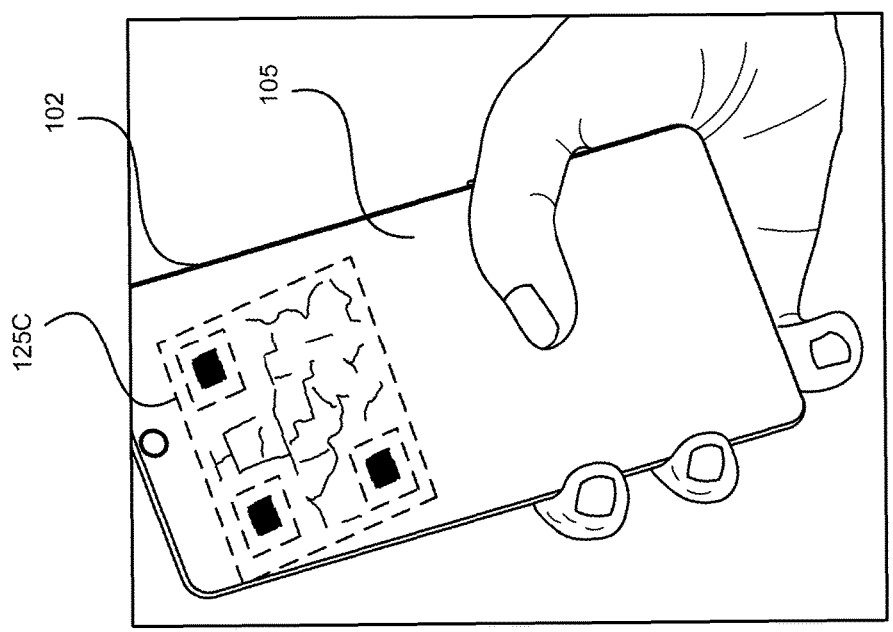
FIG. 6C is a front view of a handheld electronic device configured to emit an infrared tracking marker, in accordance with implementations as described herein.

As shown in FIG. 6C, an infrared marker 125C, such as, for example, a matrix barcode, or two-dimensional barcode, or QR code, may be generated by a display 105 of the handheld electronic device 102. For example, in some implementations, the handheld electronic device 102 may include infrared light emitting diodes (LEDs) in a backlight of the display 105, and the infrared marker 125C may be generated and emitted by the infrared LEDs in the backlight of the display 105, so that the infrared marker 125C is visible to the infrared sensor, or infrared camera, of the HMD 100, but not to the human eye. In some implementations, the infrared marker 125C may be generated and emitted by the display 105 of the handheld electronic device 102, for example, by driving pixels of the display 105 into emission in the infrared range, allowing a complex pattern to be emitted the display 105 that is visible to the infrared camera, or infrared sensor, of the HMD 100, but not to the human eye. This arrangement may allow for relatively reliable visual tracking of the handheld electronic device 102 by a relatively inexpensive infrared camera or sensor of the HMD 100, while not relying on space in a case or bezel of the handheld electronic device 102 to accommodate components for generating, affixing, or otherwise displaying the visual markers. This arrangement may also allow the display 105 and/or other manipulation surfaces of the handheld electronic device 102 to extend essentially to the outer edges of the front face of the handheld electronic device 102, essentially eliminating the need for a bezel, expanding the usable surface area of the device 102 and improving the utility of the device 102.

The example markers 125A, 125B and 125C shown in FIGS. 6A-6C are defined by matrix barcodes, or two-dimensional barcodes, or QR codes, simply for ease of discussion and illustration. However, the markers 125A, 125B and 125C may include other irregular, non-repeating patterns including defined corners and/or edges, which may be detected and recognized by the image sensor of the HMD 100 as described above.

Figure 7:
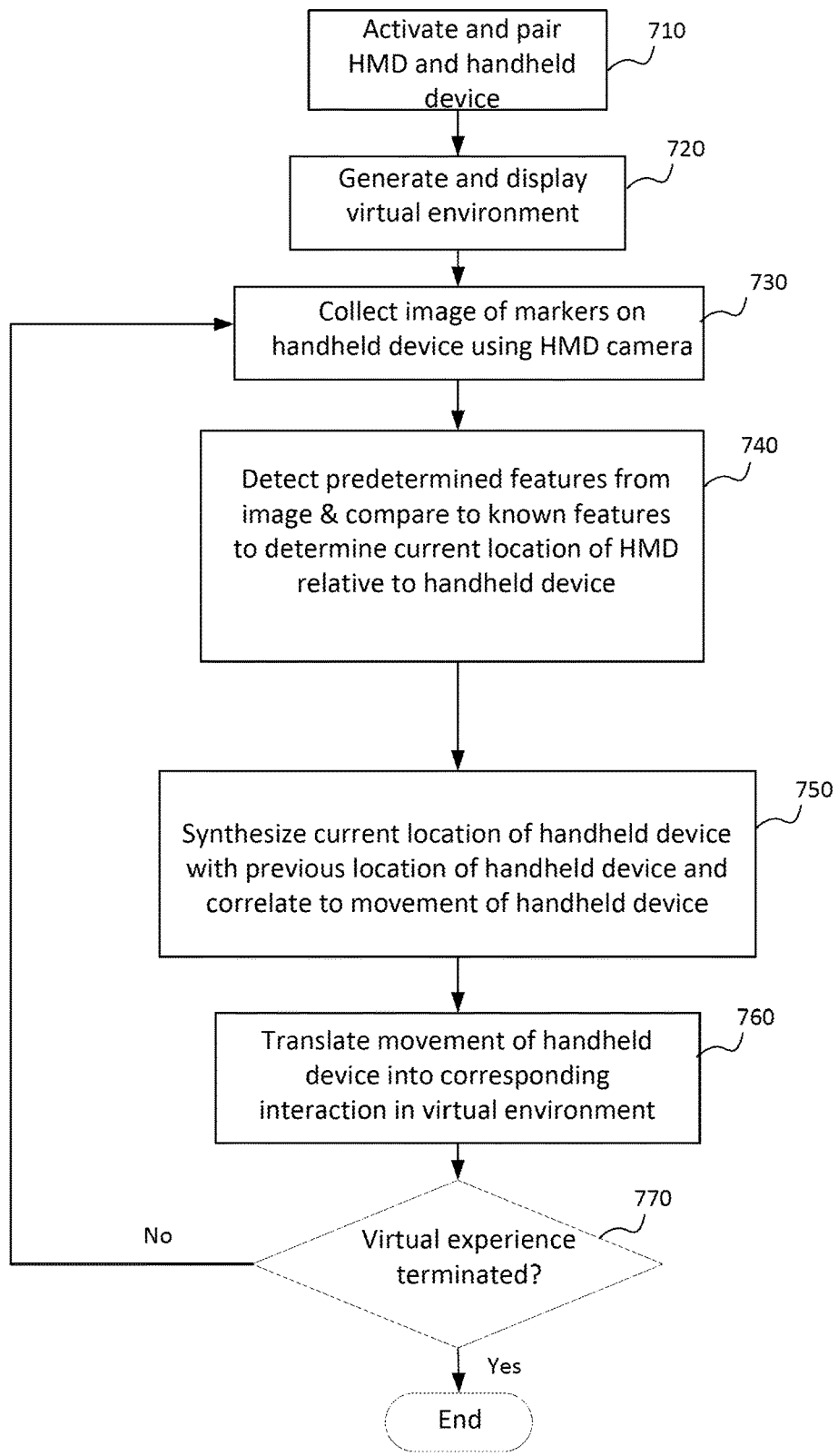
FIG. 7 is a flowchart of a method of tracking a handheld device in a virtual environment, in accordance with implementations as described herein.

A method 700 of tracking a handheld electronic device in an augmented and/or virtual reality environment, in accordance with implementations as described herein, is shown in FIG. 7. As noted above, the handheld electronic device may be, for example, the handheld electronic device 102 shown in FIG. 1. The handheld electronic device 102 may be paired with, for example, an HMD 100 as shown in FIGS. 1, 2A-2B, 3A-3E, configured to generate an augmented and/or virtual reality environment. The handheld electronic device 102 may be operably coupled to, or paired with, and/or communicate with, the HMD 100 via, for example, a wired connection, a wireless connection via for example wifi or Bluetooth, or other type of connection. After the HMD 100 and the handheld electronic device 102 have been activated and paired, at block 710, and an augmented and/or virtual reality experience has been initiated, at block 720, data collection and data synthesis may be carried out by the HMD 100 and the handheld electronic device 102 to locate and track the position and movement of the handheld electronic device 102 and translate movement of the handheld electronic device 102 into a corresponding interaction and/or movement in the virtual environment.

As noted above, a visual marker 125A may be rendered on a display screen of the handheld electronic device 102, and/or a visual marker 125B may be otherwise located on, or affixed or attached to the handheld electronic device 102. An image sensor of the HMD 100, for example, the camera 180 of the HMD 100, or an IR illuminator and IR sensor, may scan a field of view of the camera 180 and collect images within the field of view, at block 730. The system may then scan the images for predetermined features known to be included in the visual marker 125A and/or 125B on the handheld electronic device 102, at block 740. This may include, for example, a specific, non-repeating pattern, a plurality of distinct corners, and the like, as discussed above. The images, and in particular, the detected features, may be compared to known images of the visual marker 125A/125B, including the predetermined features. The captured images may be compared to the known images, and a location and/or orientation of the handheld electronic device 102 relative to the HMD 100 may be determined based on how the predetermined features appear in the image compared to how the features are known to appear, for example, in an orthogonally aligned orientation of the handheld electronic device 102 and HMD 100. In some implementations, the HMD 100 may collect and process this image data substantially continuously.

The location data may be processed by the handheld electronic device 102, at block 750, to determine movement of the handheld electronic device 102, and the determined movement of the handheld electronic device 102 may be translated into a corresponding interaction in the virtual environment generated by the HMD 100, at block 760. For example, location and movement and/or orientation data taken at a current point in time may be compared to location and movement and/or orientation data at the previous point in time, to determine a movement trajectory that is substantially continuously updated as data is continuously collected, processed and synthesized.

This process may be repeatedly performed until it is determined, at block 770, that the virtual experience has been terminated.

In this arrangement, the visual marker 125A and/or the visual marker 125B included on the handheld electronic device 102 is a passive marker, with detection, identification, processing and continuous tracking all done by the HMD 100. Locating and tracking movement of the handheld electronic device 102 in this manner may be reliably accomplished with one visual marker 125A/125B. However, locating and tracking movement of the handheld electronic device 102 in this manner relies on the processing and power resources of the HMD 100, while the HMD 100 is also generating the virtual environment and displaying the virtual environment to the user on the display 140.

Figure 8:
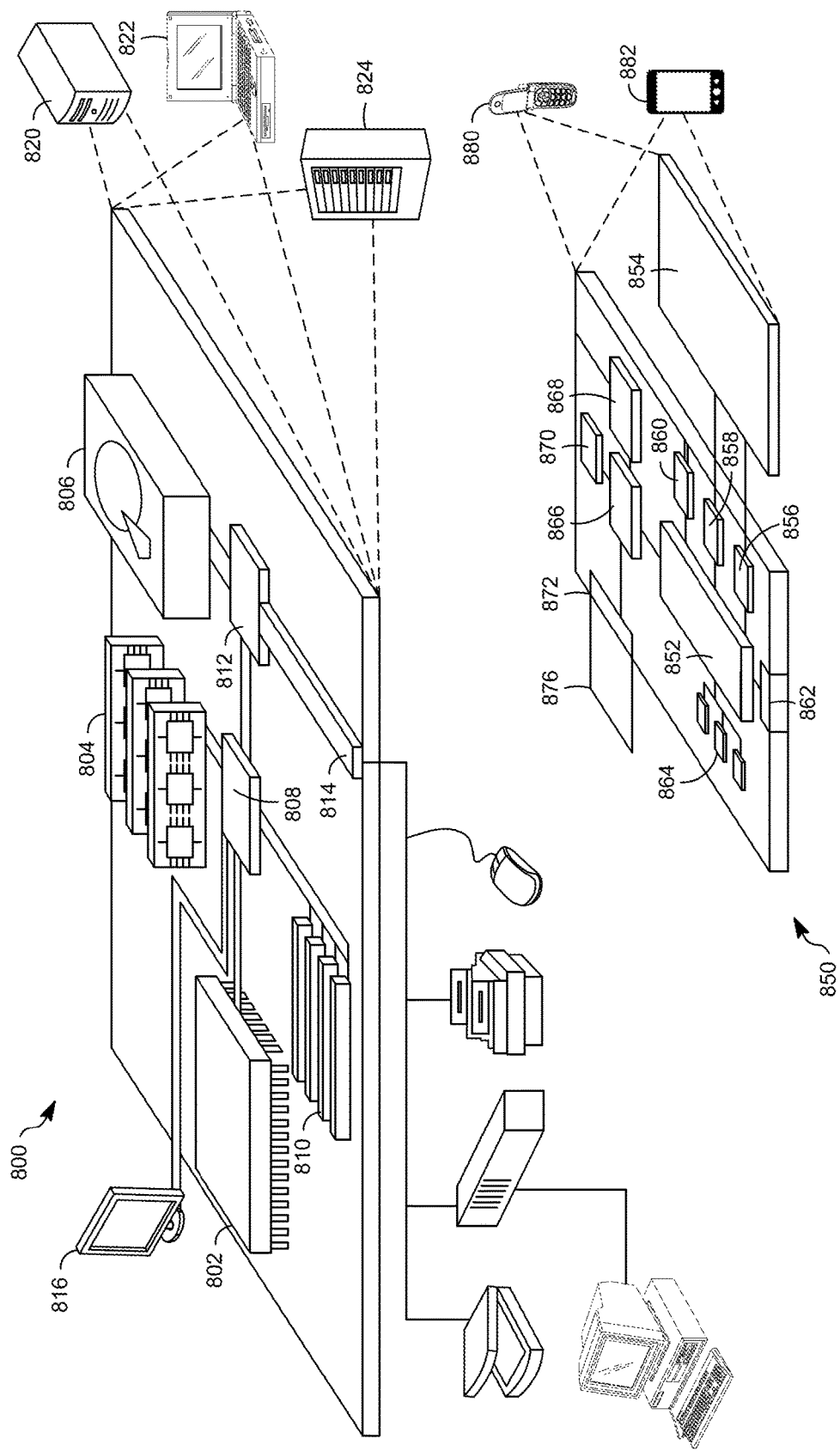
FIG. 8 shows an example of a computer device and a mobile computer device that can be used to implement the techniques described herein.

FIG. 8 shows an example of a computer device 800 and a mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be reali8ed in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset/HMD device 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control virtual objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR environment on the computing device 850 or on the VR headset 890.

In some implementations, a computing device 850 may include a touchscreen. For example, a user can interact with the touchscreen in a particular manner that can mimic what happens on the touchscreen with what happens in the VR space. For example, a user may use a pinching-type motion to Boom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers and devices, including, but not limited to laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    operably coupling a first electronic device with a second electronic device so that the first electronic device and the second electronic device are in communication with each other while operating in an ambient environment, the second electronic device being a head mounted display device used by a user and configured to generate and display a virtual environment while operating in the ambient environment, and the first electronic device being a handheld controller used by the user;
    tracking movement of the first electronic device relative to the second electronic device in a first mode, including:
        detecting, by a sensor of the first electronic device, at least one visual marker on the second electronic device, as the first electronic device moves independent of the second electronic device in the ambient environment;
        determining a location of the second electronic device relative to the first electronic device and tracking movement of the first electronic device in the ambient environment based on features detected in the at least one visual marker on the second electronic device, including:
            calculating an inverse transform of the location of the second electronic device and determining a location of the first electronic device relative to the second electronic device; and
            comparing a current location of the first electronic device to a previous location of the first electronic device to track movement of the first electronic device; and
    translating the detected and tracked movement of the first electronic device in the ambient environment into a corresponding action in the virtual environment.

2. The method of claim 1, wherein the detecting at least one visual marker and the tracking movement of the first electronic device in the ambient environment includes:
    collecting optical data using an optical sensor of the first electronic device, the optical data including images of the second electronic device;
    scanning the collected optical data and detecting a plurality of predetermined features in the scanned optical data;
    comparing the detected plurality of predetermined features to known images of the at least one visual marker on the second electronic device; and
    identifying the at least one visual marker in the collected optical data based on the detection of the plurality of predetermined features.

3. The method of claim 2, wherein the detected plurality of predetermined features includes an irregular pattern of at least one of a plurality of corners or a plurality of edges, and wherein comparing the detected plurality of predetermined features to known images of the at least one visual marker, and identifying the at least one visual marker in the collected optical data includes:
    comparing an orientation of the irregular pattern of the detected plurality of predetermined features to an orientation of a corresponding plurality of features in the known image of the at least one visual marker; and
    determining a position and an orientation of the second electronic device relative to the first electronic device based on the comparison.

4. The method of claim 3, wherein collecting optical data using an optical sensor of the first electronic device includes:
    capturing images of the second electronic device using an infrared sensor of the first electronic device with illumination provided by an infrared illuminator, the at least one visual marker including an infrared pattern on the first electronic device that is only visible to the infrared sensor while illuminated by the infrared illuminator.

5. The method of claim 2, wherein the optical sensor is a front facing camera of the handheld controller and the at least one visual marker includes a first two-dimensional barcode on a first surface of the head mounted display device and a second two-dimensional barcode on a second surface of the head mounted display device.

6. The method of claim 1, further comprising tracking movement of the first electronic device relative to the second electronic device in a second mode, including:

collecting image data using an optical sensor of the second electronic device, the optical data including images of the first electronic device;

scanning the collected optical data and detecting a plurality of predetermined features in the scanned optical data;

comparing the detected plurality of predetermined features to known images of the at least one visual marker on the second electronic device;

identifying the at least one visual marker in the collected optical data;

determining a location of the first electronic device relative to the second electronic device based on the identified at least one visual marker based on the detection of the plurality of predetermined features; and comparing a current location of the first electronic device to a previous location of the first electronic device to track movement of the first electronic device.

7. The method of claim 6, wherein the detected plurality of predetermined features includes an irregular pattern of at least one of a plurality of corners or a plurality of edges, and wherein comparing the detected plurality of predetermined features to known images of the at least one visual marker, and identifying the at least one visual marker in the collected optical data includes:

comparing an orientation of the irregular pattern of the detected plurality of predetermined features to an orientation of a corresponding plurality of features in the known image of the at least one visual marker; and determining a position and an orientation of the second electronic device relative to the first electronic device based on the comparison.

8. The method of claim 7, wherein collecting optical data using an optical sensor of the second electronic device includes:

capturing images of the first electronic device using an infrared sensor of the second electronic device with illumination provided by an infrared illuminator, the at least one visual marker including an infrared pattern defined on the first electronic device that is visible to the infrared sensor while illuminated by the infrared illuminator.

9. The method of claim 6, wherein the optical sensor is a camera on the head mounted display device and the visual marker is a two-dimensional barcode rendered on a display screen of the handheld controller or located on an outer surface of the handheld controller.

10. A system, comprising:

a handheld electronic device configured to be operably coupled with a head-mounted electronic device the head-mounted electronic device including a plurality of visual markers on an exterior surface of a housing of the head-mounted electronic device, the handheld electronic device including an optical sensor; and a processor, wherein the handheld electronic device is configured to determine a location of the head mounted electronic device relative to the handheld electronic device based on images captured by the optical sensor of the handheld electronic device, and based on identification of predetermined features in the captured images, the predetermined features corresponding to the plurality of visual markers, and calculating an inverse transform of the location of the head mounted electronic device relative to the handheld electronic device, to determine a location of the handheld electronic device relative to the head mounted electronic device, as the handheld electronic device moves independent of the head-mounted electronic device in an ambient environment.

11. The system of claim 10, wherein the plurality of visual markers includes:

a first visual marker on a first surface of the head mounted electronic device; and a second visual marker on a second surface of the head mounted electronic device.

12. The system of claim 11, wherein the first visual marker is defined by a first pattern associated with the first surface of the head mounted electronic device, the first pattern including at least one of a first non-repeating pattern or a first plurality of distinct corners, and the second visual marker is defined by a second pattern associated with the second surface of the head mounted electronic device, the second pattern including at least one of a second non-repeating pattern or a second plurality of distinct corners.

13. The system of claim 12, wherein the first pattern is a first infrared pattern associated with the first surface of the head mounted electronic device, and the second pattern is a second infrared pattern associated with the second surface of the head mounted electronic device, and wherein the optical sensor of the handheld electronic device includes an infrared illuminator and an infrared sensor such that first and second patterns are only visible to the infrared sensor while the first and second patterns are illuminated by the infrared illuminator.

14. The system of claim 12, wherein, in determining the location and movement of the head mounted electronic device relative to the handheld electronic device, the handheld electronic device is configured to:

compare an orientation of the first pattern detected in the images collected by the optical sensor to an orientation of the first pattern included in known images of the first visual marker, compare an orientation of the second pattern detected in the images collected by the optical sensor to an orientation of the second pattern included in known images of the second visual marker, and determine a position and an orientation of the head mounted electronic device relative to the handheld electronic device based on the comparisons.

15. The system of claim 11, wherein the first visual marker includes a first two-dimensional barcode associated with the front facing surface of the head mounted electronic device, and the second visual marker includes a second two-dimensional bar code associated with the bottom facing surface of the head mounted electronic device.

16. The system of claim 11, wherein the first surface is a front facing surface of the head mounted electronic device, and the second surface is a bottom facing surface of the head mounted electronic device.

17. The system of claim 10, wherein the head mounted electronic device includes a processor configured to:

capture images of the handheld electronic device using an optical sensor of the head mounted electronic device, detect a plurality of predetermined features in the images captured by the optical sensor, compare the detected plurality of predetermined features to known images of the plurality of visual markers, identify at least one visual marker based on the comparison, and determine a location of the handheld electronic device relative to the head mounted electronic device based on the identified at least one visual marker.

18. The system of claim 17, wherein the identified at least one visual marker is a two-dimensional barcode rendered on a display screen of the handheld electronic device or located on an outer surface of the handheld electronic device.

19. The system of claim 10, wherein the handheld electronic device is a handheld controller or a smartphone, and wherein movement of the handheld electronic device in an ambient environment is translated into a corresponding interaction in a virtual environment generated by the head mounted electronic device.

* * * * *